United States Patent
Ebner (10) Patent No.: US 7,009,735 B2
(45) Date of Patent: Mar. 7, 2006

(54) METHOD FOR BLACK TRAPPING AND UNDER PRINT PROCESSING

(75) Inventor: Fritz F. Ebner, Rochester, NY (US)

(73) Assignee: Xerox Corporation, Stamford, CT (US)

(*) Notice: Subject to any disclaimer, the term of this patent is extended or adjusted under 35 U.S.C. 154(b) by 999 days.

(21) Appl. No.: 10/040,690

(22) Filed: Jan. 7, 2002

(65) Prior Publication Data

US 2003/0128377 A1 Jul. 10, 2003

(51) Int. Cl.
*B41J 1/00* (2006.01)
*G06F 15/00* (2006.01)
*G03F 3/08* (2006.01)

(52) U.S. Cl. .................. 358/1.9; 358/518; 358/3.26

(58) Field of Classification Search ............. 358/1.9, 358/518, 462, 464–466, 529–530, 540, 504, 358/3.26

See application file for complete search history.

(56) References Cited

U.S. PATENT DOCUMENTS

| 5,313,570 | A | * | 5/1994 | Dermer et al. ............. 345/589 |
| 5,923,821 | A | | 7/1999 | Birnbaum et al. |
| 6,594,030 | B1 | * | 7/2003 | Ahlstrom et al. .......... 358/1.15 |
| 6,798,540 | B1 | * | 9/2004 | Kritayakirana et al. ...... 358/1.9 |

* cited by examiner

*Primary Examiner*—Mark Wallerson
*Assistant Examiner*—Charlotte M. Baker
(74) *Attorney, Agent, or Firm*—Fay, Sharpe, Fagan, Minnich & McKee, LLP (57) ABSTRACT

A method for performing black trapping and under print processing on image data from a raster image processing (RIP) frame buffer is provided. The image data includes pixel data according to a predetermined color space (e.g., RGB) and may include black rendering hints. If black rendering hints are not included, the method includes steps to determine if each pixel from the frame buffer is black or black with respect to predetermined thresholds. Three further embodiments of the method are provided in regard to CMY under print values for a black pixel when all pixels of a context window surrounding the black pixel are black. One embodiment provides no CMY under print. Another embodiment provides a predefined CMY under print. Still another embodiment provides an adaptive CMY under print based on the last saved CMY under print value.

28 Claims, 10 Drawing Sheets

METHOD FOR BLACK TRAPPING AND UNDER PRINT PROCESSING

BACKGROUND OF THE INVENTION

The present invention relates to color image processing for copiers, printers, and similar rendering devices. It finds particular application in conjunction with black trapping and under print processing to eliminate undesirable image artifacts associated with misregistration of color marking to black marking, and will be described with particular reference thereto. However, it is to be appreciated that the present invention is also amenable to other like applications.

In the operation of copiers and printers, particularly color machines, it is highly desirable to have means for processing and enhancing text and image quality Particularly in the case of single or multi-pass color printers, it is highly desirable that a digital trapping system be employed to reduce imaging problems caused by misregistration, shift and other undesirable printed image qualities. Various systems and corrective actions have been taken to prevent the occurrence of these and other undesirable image attributes, including various aspects of image trapping and spreading.

For example, U.S. Pat. No. 5,923,821 to Birnbaum et al. ("Birnbaum") discloses a system for trapping of a dark image object on a lighter colored background. In a system using a page description language including overprint operators, black image areas (such as text, lines, graphic objects and the like) can be set to overprint colored background areas in a manner that eliminates rendered image defects including page-colored "halo" effect that can occur when the cutout background area underlying the black object is misregistered with the black object that was intended to cover the cutout area. In other systems, Birnbaum may be employed to disable the under color removal system of a colored area that would otherwise be present under the black object. Systems using black plus at least one other toner or ink color (such as but not limited to cyan, magenta and/or yellow) can usefully employ the system. The trapping system of Birnbaum may also be employed on an object-oriented basis, such that different image object types are trapped according to the system and at least one other trapping system.

Multiple color image misregistration is one example of when digital color printing problems can arise in multi-pass color print engines. For example, when black text or lines are printed on a colored background, the registration of the black text or line and colored background area may be unaligned, a white (paper color) "halo" effect on one or more sides of the text may be created, resulting in highly visible and undesirable rendered image degradation. In the case of fine print, lines or even pictorial or small graphic images, such misregistration can appear even more pronounced, as well as making text difficult to read. In that "perfect" multi-color printing registration is difficult (or might occur only by chance on even the most precise printing engines), electronic printing technologies can turn to image processing solutions to counteract misregistration problems in order to enhance image quality.

Misregistration of the color separations or planes may actually be caused by the method in which the image planes are created. Generally, due to image quality versus hardware costs tradeoffs, image quality sacrifices are often made in favor of cost control. A manner in which registration problems in the graphic arts industry have been dealt with is by graphic arts spreading and choking techniques. "Spreading" may be defined as growth of an object within the image, while "choking" may be defined as the reduction of an object within the image. In the example of text printing on a colored background, the black text is spread, while the "hollowed out" area in the solid color background is choked. The result is a slight overlap of the solid color background with the black text image, which is able to hide misregistration problems. While trapping (or the combination of spreading and choking) is not complex to implement in the graphics arts industry, a trapping implementation in the digital electronic imaging industry can be quite difficult. In electronic imaging, one implementation includes changing the page description language (PDL) representation (format) of the image.

The present invention contemplates a new and improved method for black trapping that overcomes the above-referenced problems and others.

SUMMARY OF THE INVENTION

In accordance with one aspect of the invention, a method for performing black trapping on image data from a raster image processing (RIP) frame buffer is provided. The image data from the RIP frame buffer includes pixel data according to a predetermined color space and black rendering hints. The method is comprised of the following steps: a) receiving the pixel data and the black rendering hints from the frame buffer; b) converting the pixel data from the frame buffer to C,M,Y data; c) retrieving the C,M,Y data and an associated black rendering hint for a first pixel, d) determining if the black rendering hint for the first pixel is true, e) if the black rendering hint is true, performing a black trapping algorithm using a plurality of pixels forming a context window associated with the first pixel and subsequently rendering the first pixel according to an under print system, otherwise, subsequently rendering the first pixel according to a default rendering system; f) determining if additional pixel data from the frame buffer is to be processed in accordance with steps c) through e); and, g) if additional pixel data is to be processed, repeating steps c) through e) for a next pixel, otherwise, ending the process.

In accordance with another aspect of the invention, a method for performing black trapping on image data from a RIP frame buffer is provided. The image data from the RIP frame buffer includes pixel data according to a predetermined color space. The method is comprised of the following steps a) receiving the pixel data from the frame buffer; b) converting the pixel data from the frame buffer to C,M,Y,K pixel data, c) retrieving one or more components of pixel data from the group consisting of pixel data from the frame buffer and C,M,Y,K pixel data for a first pixel; d) determining if the first pixel is black with respect to predetermined thresholds for one or more components of the pixel data retrieved; e) if the first pixel is black, performing a black trapping algorithm using a plurality of pixels forming a context window associated with the first pixel and subsequently rendering the first pixel according to an under print system, otherwise, subsequently rendering the first pixel according to a default rendering system; f) determining if additional pixel data from the frame buffer is to be processed in accordance with steps c) through e); and, g) if additional pixel data is to be processed, repeating steps c) through e) for a next pixel, otherwise, ending the process.

Still further advantages and benefits of the invention will become apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for purposes of illustrating embodiments of the invention and are not to be construed as limiting the invention.

DETAILED DESCRIPTION OF THE INVENTION

Figure 1:
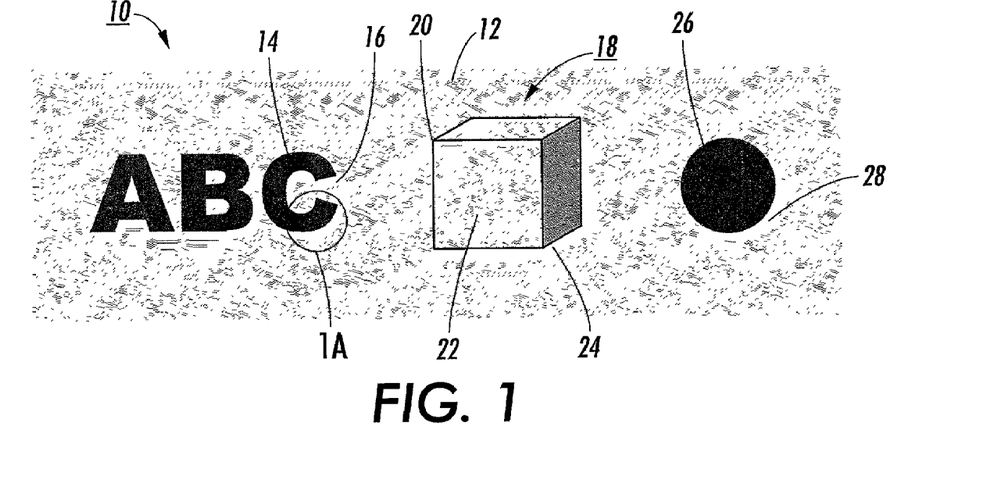
FIGS. 1–1A are an exemplary color rendering from a print system with misregistration between black marking material and color marking material.
Figure 2:
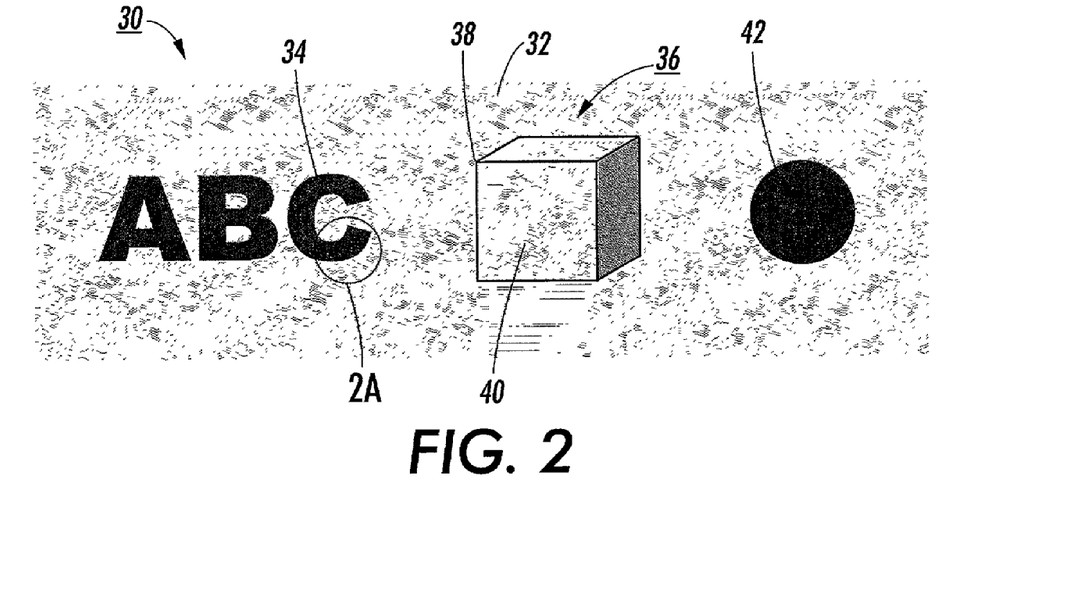
FIGS. 2–2A are an exemplary color rendering from a print system in proper registration or from a print system with misregistration between black marking material and color marking material that implements an embodiment of the present invention to eliminate the undesirable image artifacts associated with the misregistration.

Turning now to FIG. 1 and FIG. 2, depicted in FIG. 1 is a representation of a misregistered/untrapped misregistered image. FIG. 2, in comparison, is a representation of a trapped or choked (i.e., precisely registered) image on a colored background.

Figure 1A:
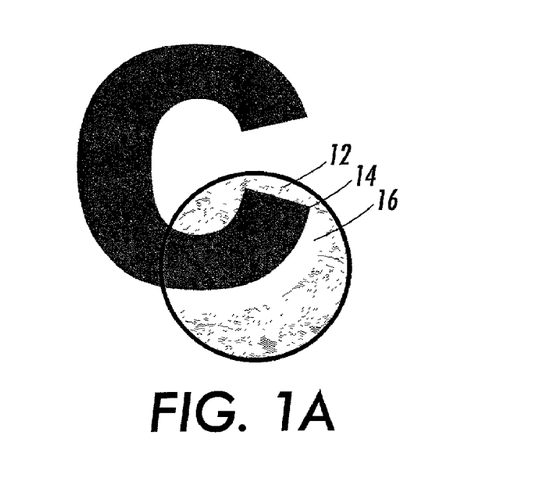

The positive effect of the trapping solution of the present invention can be quite dramatic (Compare FIGS. 1 and 1A to FIGS. 2 and 2A). As shown in FIGS. 1 and 1A, various untrapped or misregistered examples are shown for a rendered image 10 including a colored background 12 with a variety of text and objects thereon. A black text portion 14 is shown, as well as an adjacent white "halo" area 16, where the colored background area 12 is not present or has been cleared from under black text 14.

FIG. 1 also shows a black outlined graphic object 18 (i e, cube), with black lines 20 and solid object area 22, an adjacent white "halo" area 24, where the colored background area 12 is not present or has been cleared from under black outlined object 18 is also shown. FIG. 1 also shows a solid black object 26 (i.e, circle) and an adjacent white "halo" area 28, where the colored background area 15 is likewise not present or has been cleared.

Figure 2A:
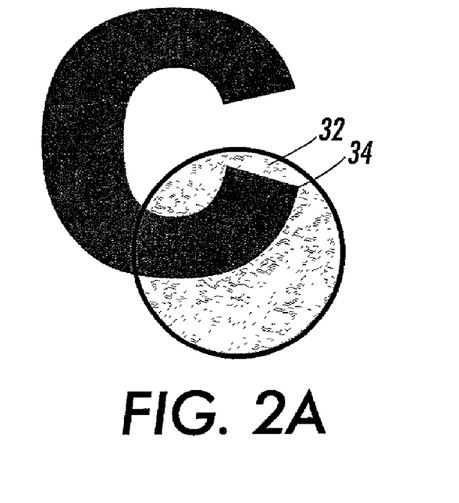

FIGS. 2 and 2A shows a rendered image 30 rendered by a precisely registered rendering device or using black trapping to eliminate the undesirable artifacts present in the rendered image 10 of FIGS. 1 and 1A. The rendered image 30 shows a colored background 32 having a variety of text and objects thereon. A black text portion 34 is shown and no adjacent white "halo" area. FIG. 2 also shows a black outlined graphic object 36 (i.e., cube), with black lines 38 and solid object area 40 without the adjacent white "halo" area shown in FIG. 1. FIG. 2 also shows a solid black object 42 (i e, circle) without the adjacent white "halo" area shown in FIG. 1.

Figure 3:
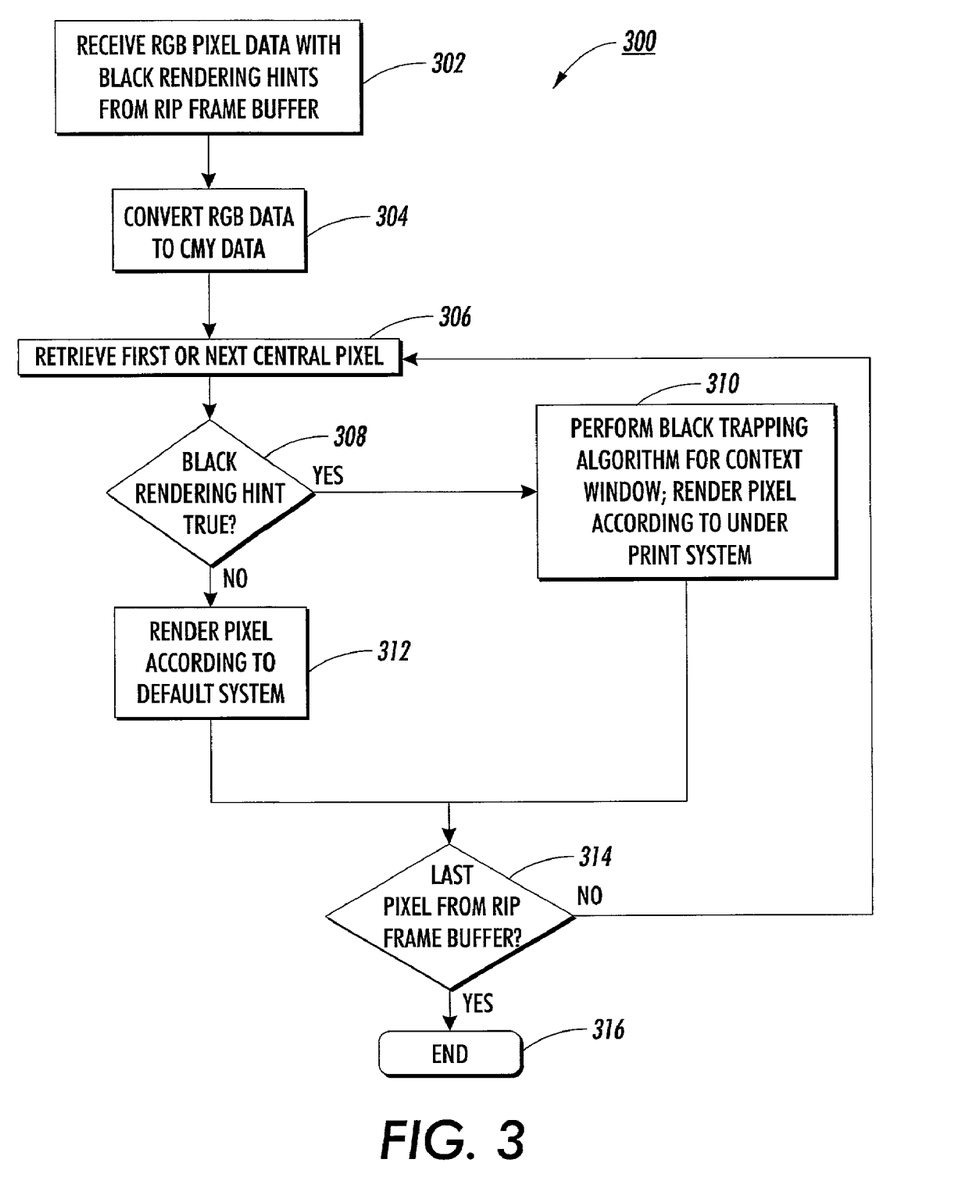
FIG. 3 is a flowchart of a method for performing black trapping on image data from a raster image processing (RIP) frame buffer using black rendering hints.

With reference to FIG. 3, a flowchart of one embodiment of a method 300 for performing black trapping on image data from a raster image processing (RIP) frame buffer using black rendering hints is provided. In the embodiment being described the image data includes pixel data represented by R,G,B coordinates in an RGB color space and black rendering hints. A black rendering hint is associated with each pixel. Black rendering hints are developed, for example by combining a "lines and text" hint with logic indicating that the pixel is black (e.g., R==G==B==0) or black with respect to predetermined thresholds (e.g., $R+G+B<T_1$ or $R<T_2$, $G<T_3$, $B<T_4$). In other embodiments of the invention, the output from the RIP frame buffer may be represented in alternate color spaces such as but not limited to LAB, CIE. The invention works equally well when the output of the RIP frame buffer is represented in any color space that does not include a black or K channel.

The first step of the black trapping method 300 is receiving RGB pixel data with black rendering hints from a RIP frame buffer 302. Next, the RGB pixel data is converted to CMY pixel data 304. The iterative portion of the method 300 begins by retrieving the pixel data (i.e., C,M,Y pixel data and black rendering hint) for a first pixel 306 of the image to be processed. Next, the method 300 determines if the black rendering hint for the retrieved pixel is true 308 (i.e., black rendering hint indicates the pixel color is black or black with respect to predetermined thresholds). If the black rendering hint is true, a black trapping and under print algorithm is performed for a context window of the retrieved pixel and the retrieved pixel is subsequently printed according to an under print rendering system 310. If the black rendering hint is not true, the retrieved pixel is subsequently printed according to a default rendering system 312. Next, the method 300 determines if the pixel retrieved from the frame buffer is the last pixel from the frame buffer to be processed 314. If the pixel retrieved from the frame buffer is the last pixel, the black trapping method is at its end 316, otherwise, steps 306 through 314 are repeated for a next pixel of the image from the RIP frame buffer.

Figure 4:
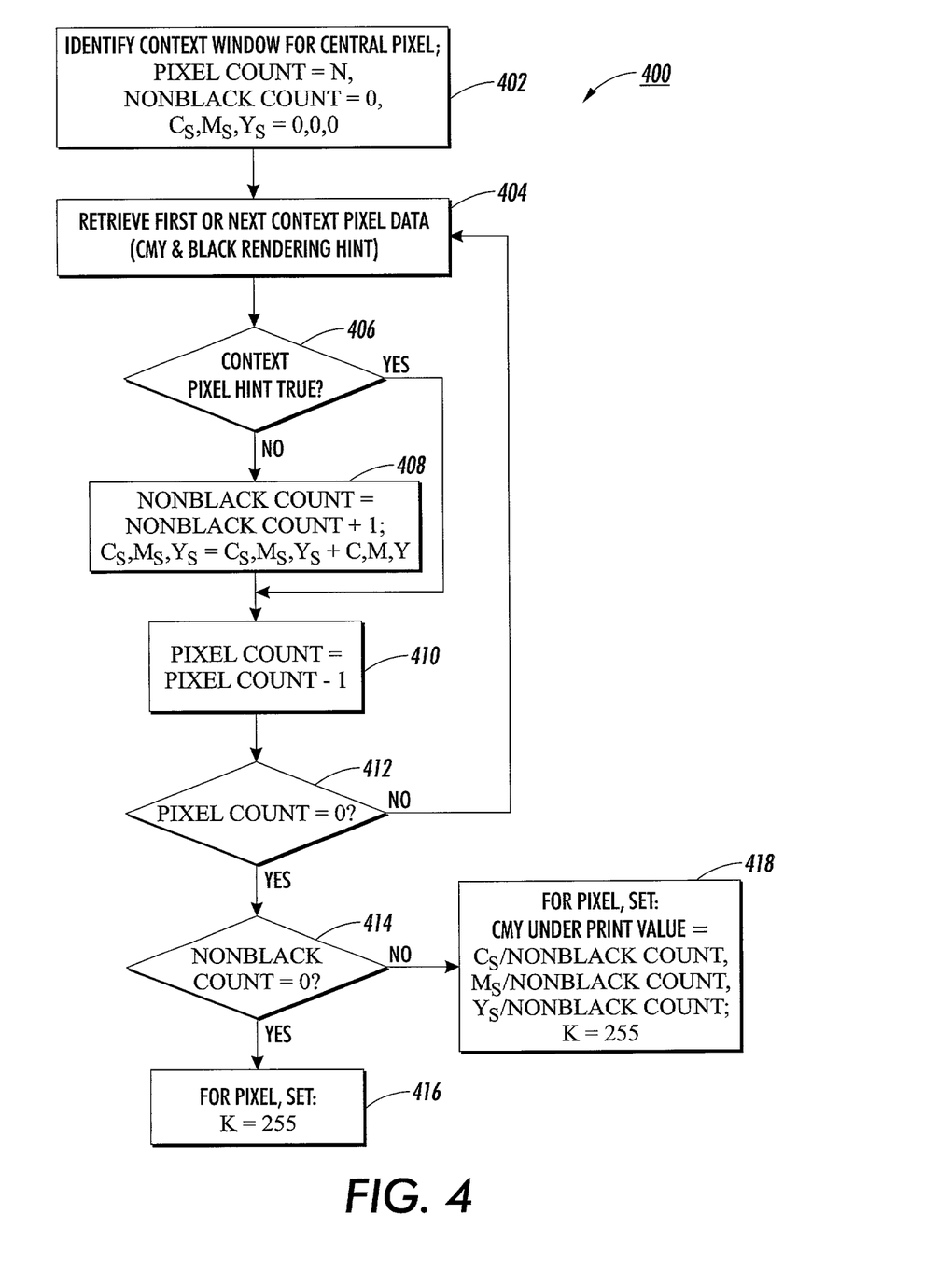
FIG. 4 is a flowchart of one embodiment of a black trapping and under print algorithm from the flowchart of FIG. 3.

With reference to FIG. 4, a flowchart of one embodiment of the black trapping and under print algorithm 310 from the flowchart of FIG. 3 is provided. This embodiment of the algorithm 400 begins with the identification of a context window surrounding the first pixel, establishment of a pixel counter (PIXEL COUNT) with an initial value equal to N, establishment of a nonblack pixel counter (NONBLACK-COUNT) with an initial value equal to zero, and establish ment of $C_S$, $M_S$, $Y_S$ color summation values with an initial value of 0,0,0 (402). The context window, for example, may be a 5 pixel by 5 pixel window with a central pixel and 24 context pixels. In this example, N equals 24. Alternate size context windows are contemplated, particularly where the central pixel is within the first two perimeter rows of the image data to be processed.

The iterative portion of the algorithm 400 begins by retrieving the pixel data (i.e, C,M,Y pixel data and black rendering hint) for a first context pixel 404 of the context window. Next, the algorithm 400 determines if the black rendering hint for the retrieved context pixel is true 406 (i e, black rendering hint indicates the context pixel color is black or black with respect to predetermined thresholds). If the black rendering hint is true, the PIXEL COUNT is decreased by one 410. If the black rendering hint is not true, the NONBLACK COUNT is increased by one and the C,M,Y value for the retrieved context pixel is added to the current value for $C_S$, $M_S$, $Y_S$ (408) and the PIXEL COUNT is decreased by one 410. Next, the algorithm 400 determines if the PIXEL COUNT equals zero 412. If the PIXEL COUNT equals zero, the algorithm determines if the NONBLACK COUNT equals zero 414, otherwise, steps 404 through 412 are repeated for a next context pixel of the context window. If the NONBLACK COUNT equals zero, the K value for the pixel retrieved from the frame buffer is set to 255 (416). If the NONBLACK COUNT is not equal to zero, the $C_S$, $M_S$, $Y_S$ color summation values are divided by the NONBLACK COUNTER and the C,M,Y under print value for the pixel retrieved from the frame buffer is set to the result of this division (i.e, $C_{AVG}$, $M_{AVG}$, $Y_{AVG}$ for the nonblack pixels in the context window) and the K value for the pixel retrieved from the frame buffer is set to 255 (418).

Figure 5:
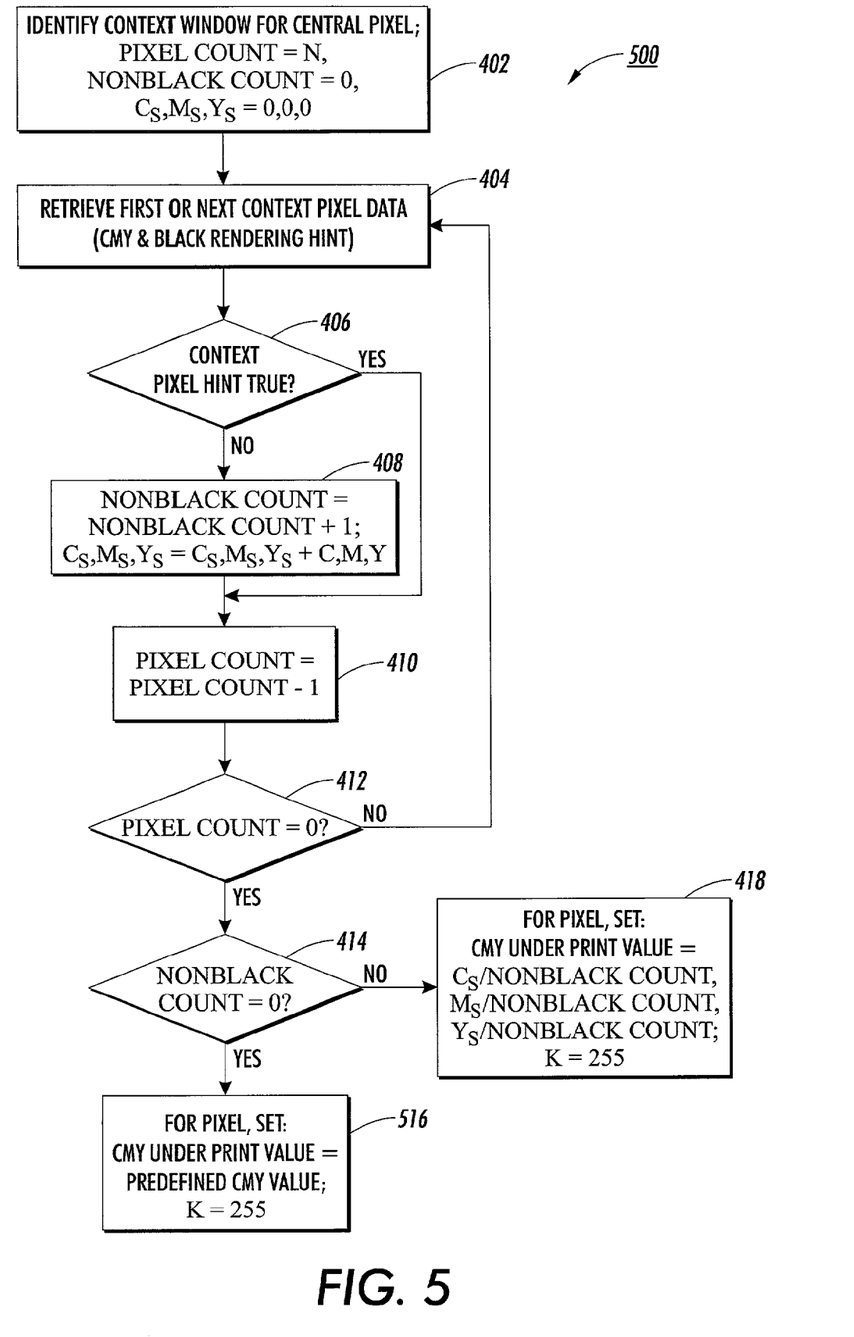
FIG. 5 is a flowchart of another embodiment of a black trapping and under print algorithm from the flowchart of FIG. 3.

The following pseudo code is an alternate way of representing the black trapping and under print algorithm 400 of FIG. 4:

With reference to FIG. 5, a flowchart of another embodiment of the black trapping and under print algorithm 310 from the flowchart of FIG. 3 is provided This embodiment of the algorithm 500 is similar to the black trapping and under print algorithm 400 of FIG. 4, except at step 414, if the NONBLACK COUNT equals zero, the C,M,Y under print value for the pixel retrieved from the frame buffer is set to a predefined C,M,Y value and the K value for the pixel retrieved from the frame buffer is set to 255 (516).

The following pseudo code is an alternate way of representing the black trapping and under print algorithm 500 of FIG. 5:

```
If current pixel hint is True then
    Find the average color of the pixels within the context window where
    the hint is False
    Count the number of pixels where the hint is False
    If the count > 0 then
        Assign the average color to the current pixel for C,M,Y and set
        K=255
    Else
        Apply predefined under print value to C,M,Y and set K=255
Else
    Do not modify the current pixel
```

Figure 6:
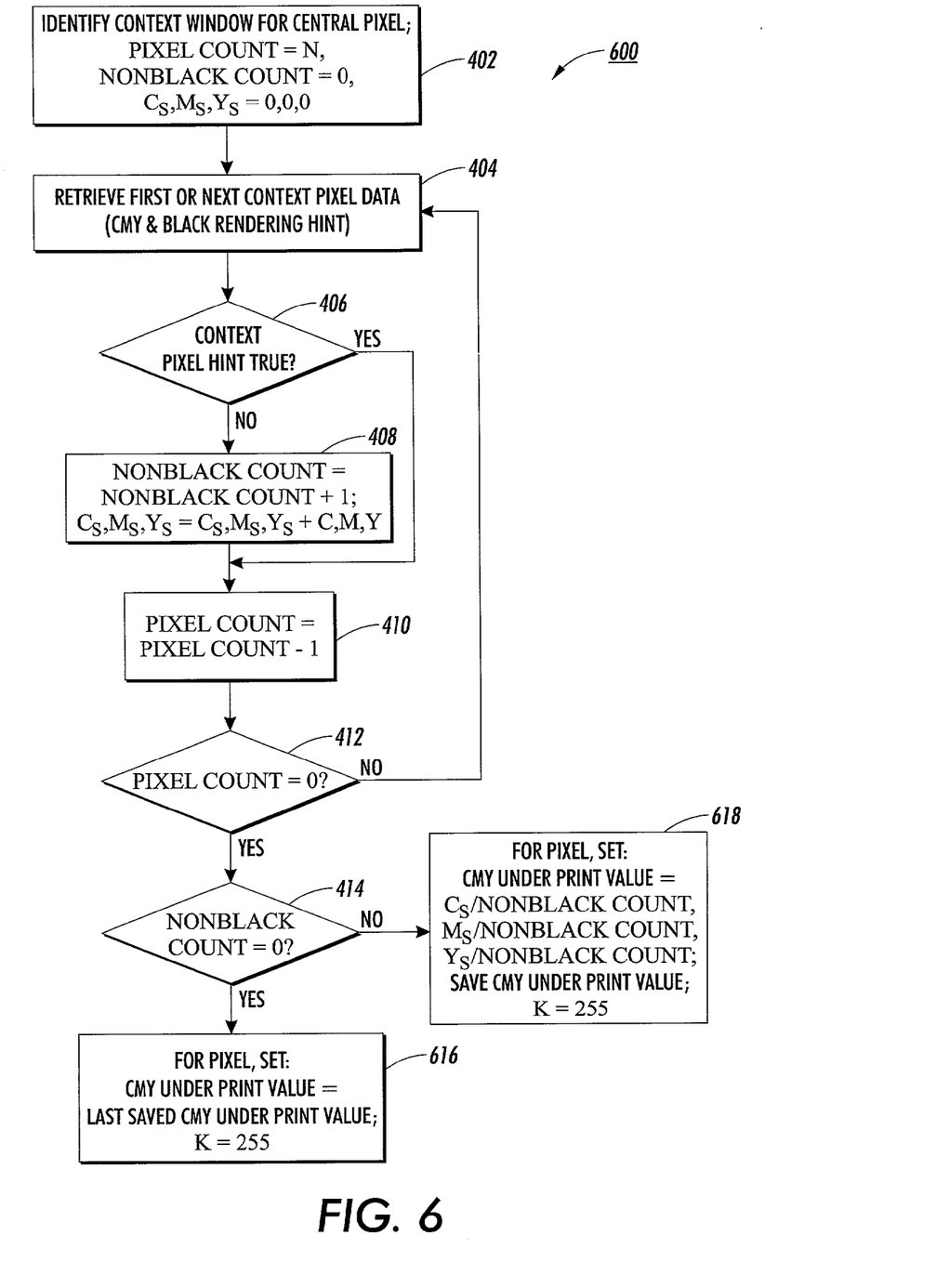
FIG. 6 is a flowchart of still another embodiment of a black trapping and under print algorithm from the flowchart of FIG. 3.

With reference to FIG. 6, a flowchart of still another embodiment of the black trapping and under print algorithm 310 from the flowchart of FIG. 3 is provided This embodiment of the algorithm 600 is similar to the black trapping and under print algorithm 400 of FIG. 4. The differences are shown after step 414, at steps 616 and 618, At step 414, if the NONBLACK COUNT does not equal zero, the C,M,Y under print value for the pixel retrieved from the frame buffer, resulting from dividing the $C_S$, $M_S$, $Y_S$ color summation values by the NONBLACK COUNTER (i e , $C_{AVG}$, $M_{AVG}$, $Y_{AVG}$ for the nonblack pixels in the context window), is saved 618. Alternatively, at step 414, if the NONBLACK COUNT equals zero, the C,M,Y under print value for the pixel retrieved from the frame buffer is set to the last saved C,M,Y under print value and the K value for the pixel retrieved from the frame buffer is set to 255 (616).

The following pseudo code is an alternate way of representing the black trapping and under print algorithm 600 of FIG. 6.

```
If current pixel hint is True then
    Find the average color of the pixels within the context window where
    the hint is False
    Count the number of pixels where the hint is False
    If the count > 0 then
        Assign the average color to the current pixel for C,M,Y and set
        K=255
    Else
        Do not modify C,M,Y (i.e., no under print) and set K=255
Else
    Do not modify the current pixel.
```

```
If current pixel hint is True then
    Find the average color of the pixels within the context window where
    the hint is False
    Count the number of pixels where the hint is False
    If the count > 0 then
        Assign the average color to the current pixel for C,M,Y and set
        K=255
    Else
        Apply last saved average value to C,M,Y (i.e., adaptive under
        print value) and set K=255
Else
    Do not modify the current pixel.
```

Figure 7:
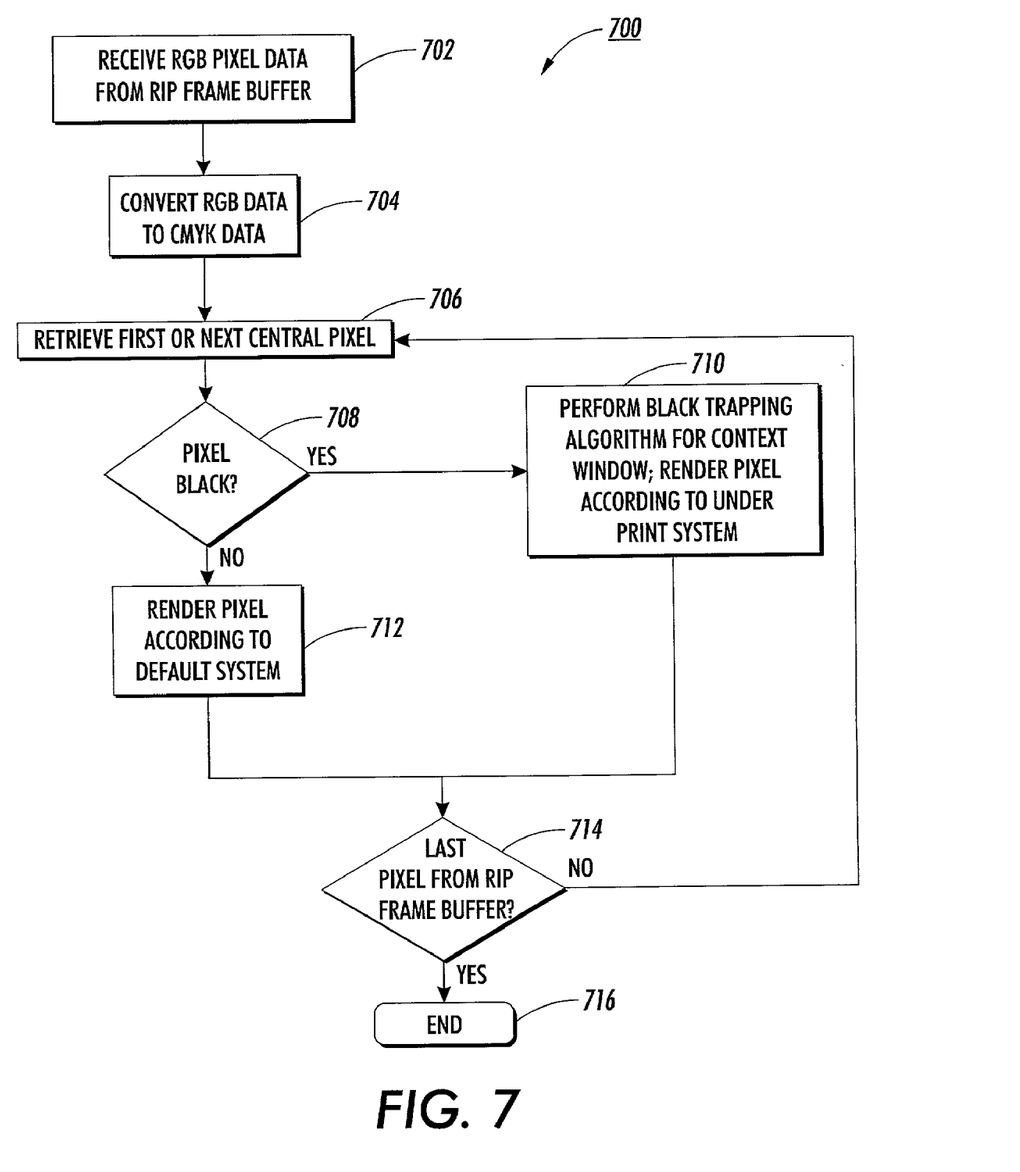
FIG. 7 is a flowchart of a method for performing black trapping on image data from a RIP without using black rendering hints.

With reference to FIG. 7, a flowchart of a method 700 for performing black trapping on image data from a RIP frame buffer without using black rendering hints is provided. In the embodiment being described the image data includes pixel data represented by R,G,B coordinates in an RGB color space. In other embodiments of the invention, the output from the RIP frame buffer may be represented in alternate color spaces. The invention works equally well when the output of the RIP frame buffer is represented in any color space that does not include a black or K channel.

The first step of the black trapping method 700 is receiving RGB pixel data from a RIP frame buffer 702. Next, the RGB pixel data is converted to CMYK pixel data 704. The iterative portion of the method 700 begins by retrieving the pixel data (i.e., one or more components of the R,G,B pixel data or one or more components of the C,M,Y,K pixel data) for a first pixel 706 of the image to be processed. Next, the method 300 determines if the retrieved pixel is black (e.g, R==G==B==0, K=255) or black with respect to predetermined thresholds (e g., $R+G+B<T_1$, $R<T_2$, $G<T_3$, $B<T_4$; $C+M+Y>T_5$; $C>T_6$, $M>T_7$, $Y>T_8$, $K>T_9$) 708. If the retrieved pixel is black, a black trapping and under print algorithm is performed for a context window of the retrieved pixel and the retrieved pixel is subsequently printed according to an under print rendering system 710. If the retrieved pixel black is not black, the retrieved pixel is subsequently printed according to a default rendering system 712. Next, the method 700 determines if the pixel retrieved from the frame buffer is the last pixel from the frame buffer to be processed 714. If the pixel retrieved from the frame buffer is the last pixel, the black trapping method is at its end 716, otherwise, steps 706 through 714 are repeated for a next pixel of the image from the RIP frame buffer.

Figure 8:
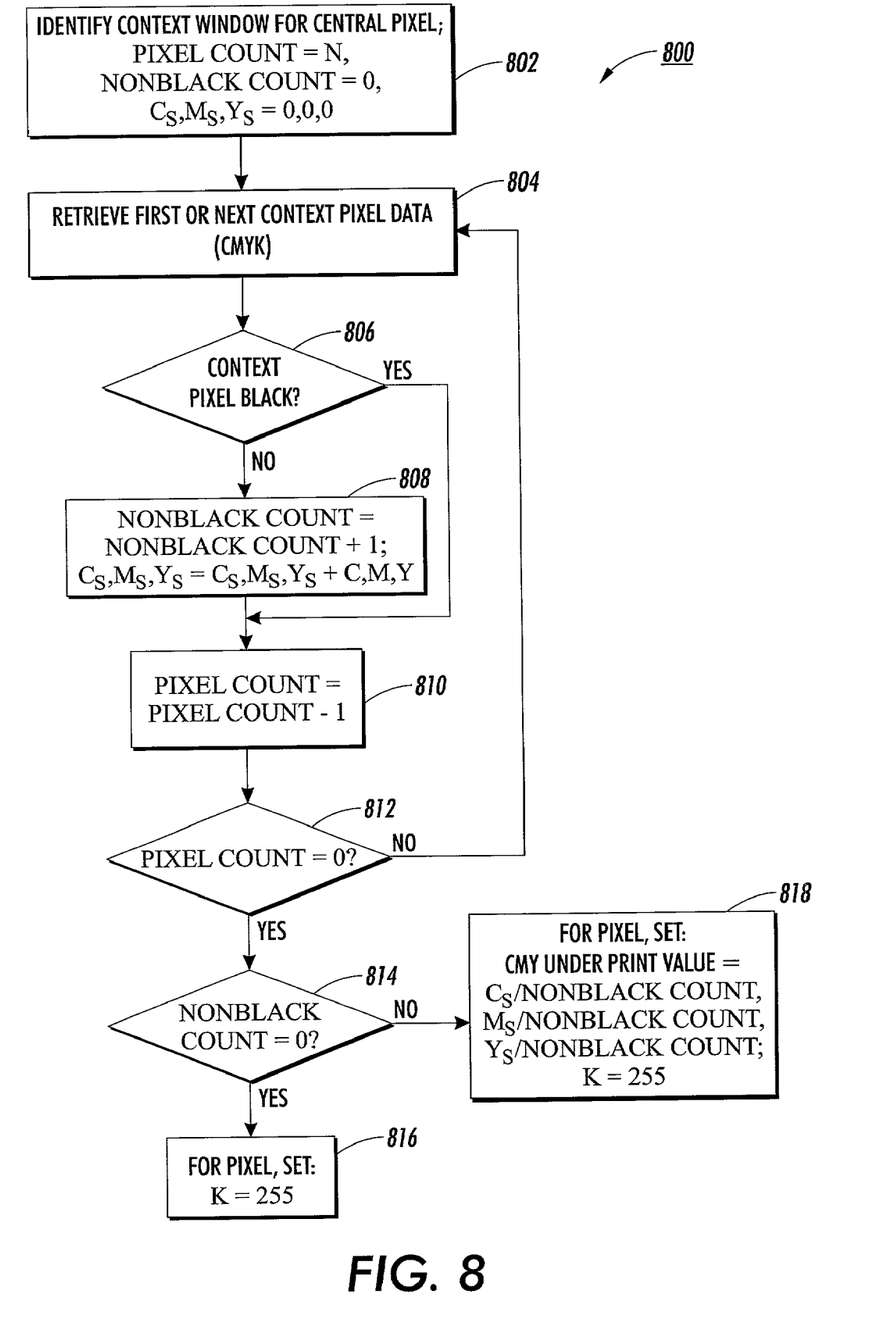
FIG. 8 is a flowchart of one embodiment of a black trapping and under print algorithm from the flowchart of FIG. 7.

With reference to FIG. 8, a flowchart of one embodiment of the black trapping and under print algorithm 710 from the flowchart of FIG. 7 is provided. This embodiment of the algorithm 800 begins with the identification of a context window surrounding the first pixel, establishment of a pixel counter (PIXEL COUNT) with an initial value equal to N, establishment of a nonblack pixel counter (NONBLACK COUNT) with an initial value equal to zero, and establishment of $C_S$, $M_S$, $Y_S$ color summation values with an initial value of 0,0,0 (802). The context window, for example, may be a 5 pixel by 5 pixel window with a central pixel and 24 context pixels In this example, N equals 24. Alternate size context windows are contemplated, particularly where the central pixel is within the first two perimeter rows of the image data to be processed.

The iterative portion of the algorithm 800 begins by retrieving the pixel data (i.e., C,M,Y,K pixel data) for a first context pixel 804 of the context window Next, the algorithm 800 determines if the retrieved context pixel is black (e g, R==G==B==0, K=255) or black with respect to predetermined thresholds (e.g, $R+G+B<T_1$; $R<T_2$, $G<T_3$, $B<T_4$, $C+M+Y>T_5$; $C>T_6$, $M>T_7$, $Y>T_8$; $K>T_9$) 806. If the retrieved context pixel is black, the PIXEL COUNT is decreased by one 810. If the retrieved pixel is not black, the NONBLACK COUNT is increased by one and the C,M,Y value for the retrieved context pixel is added to the current value for $C_S$, $M_S$, $Y_S$ (808) and the PIXEL COUNT is decreased by one 810. Next, the algorithm 800 determines if the PIXEL COUNT equals zero 812. If the PIXEL COUNT equals zero, the algorithm determines if the NONBLACK COUNT equals zero 814, otherwise, steps 804 through 812 are repeated for a next context pixel of the context window. If the NONBLACK COUNT equals zero, the K value for the pixel retrieved from the frame buffer is set to 255 (816). If the NONBLACK COUNT is not equal to zero, the $C_S$, $M_S$, $Y_S$ color summation values are divided by the NONBLACK COUNTER and the C,M,Y under print value for the pixel retrieved from the frame buffer is set to the result of this division (i e, $C_{AVG}$, $M_{AVG}$, $Y_{AVG}$ for the nonblack pixels in the context window) and the K value for the pixel retrieved from the frame buffer is set to 255 (818).

Figure 9:
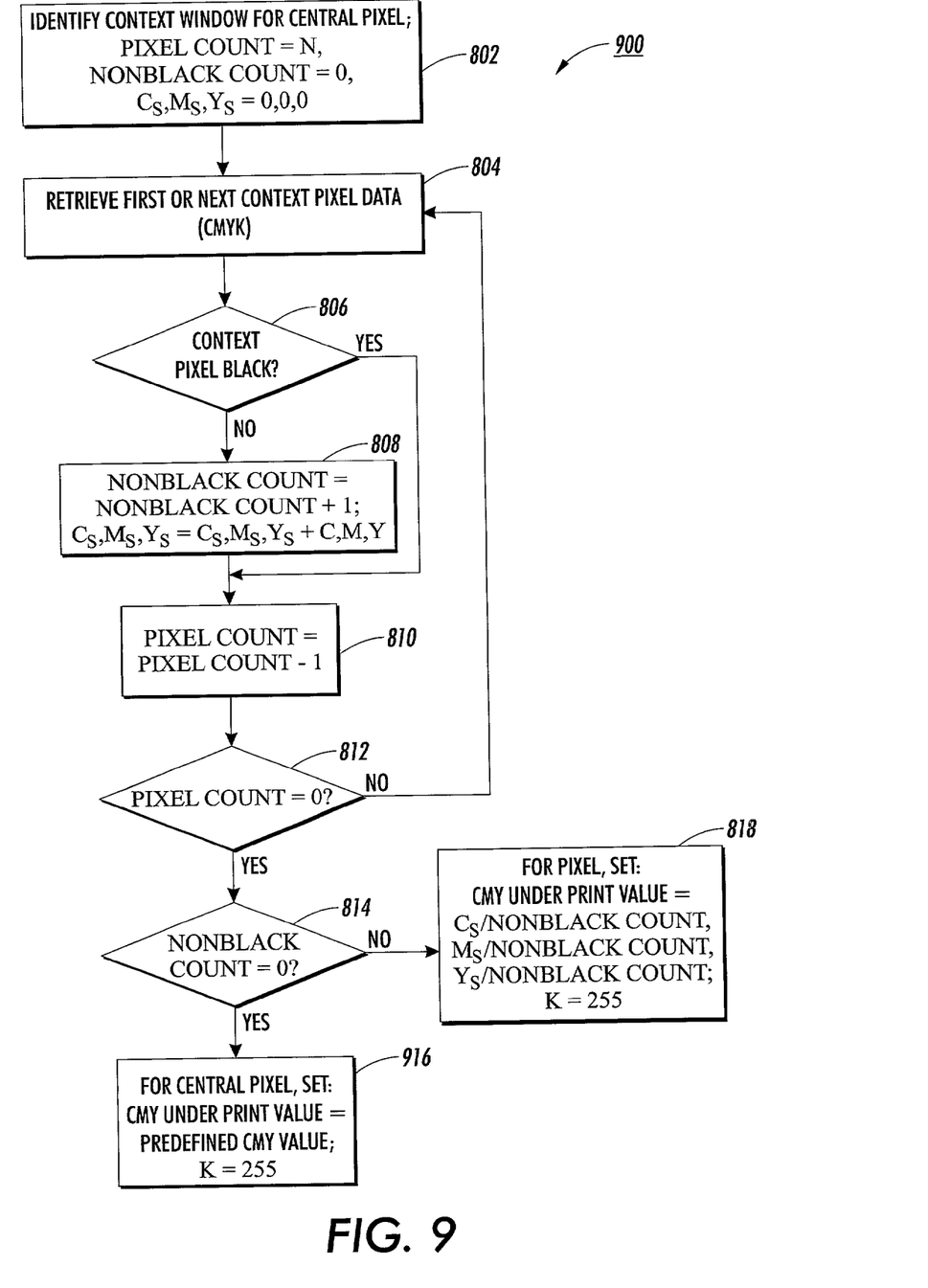
FIG. 9 is a flowchart of another embodiment of a black trapping and under print algorithm from the flowchart of FIG. 7; and, FIG. 10 is a flowchart of still another embodiment of a black trapping and under print algorithm from the flowchart of FIG. 7.

With reference to FIG. 9, a flowchart of another embodiment of the black trapping and under print algorithm 710 from the flowchart of FIG. 7 is provided. This embodiment of the algorithm 900 is similar to the black trapping and under print algorithm 800 of FIG. 8, except at step 814, if the NONBLACK COUNT equals zero, the C,M,Y under print value for the pixel retrieved from the frame buffer is set to a predefined C,M,Y value and the K value for the pixel retrieved from the frame buffer is set to 255 (916).

Figure 10:
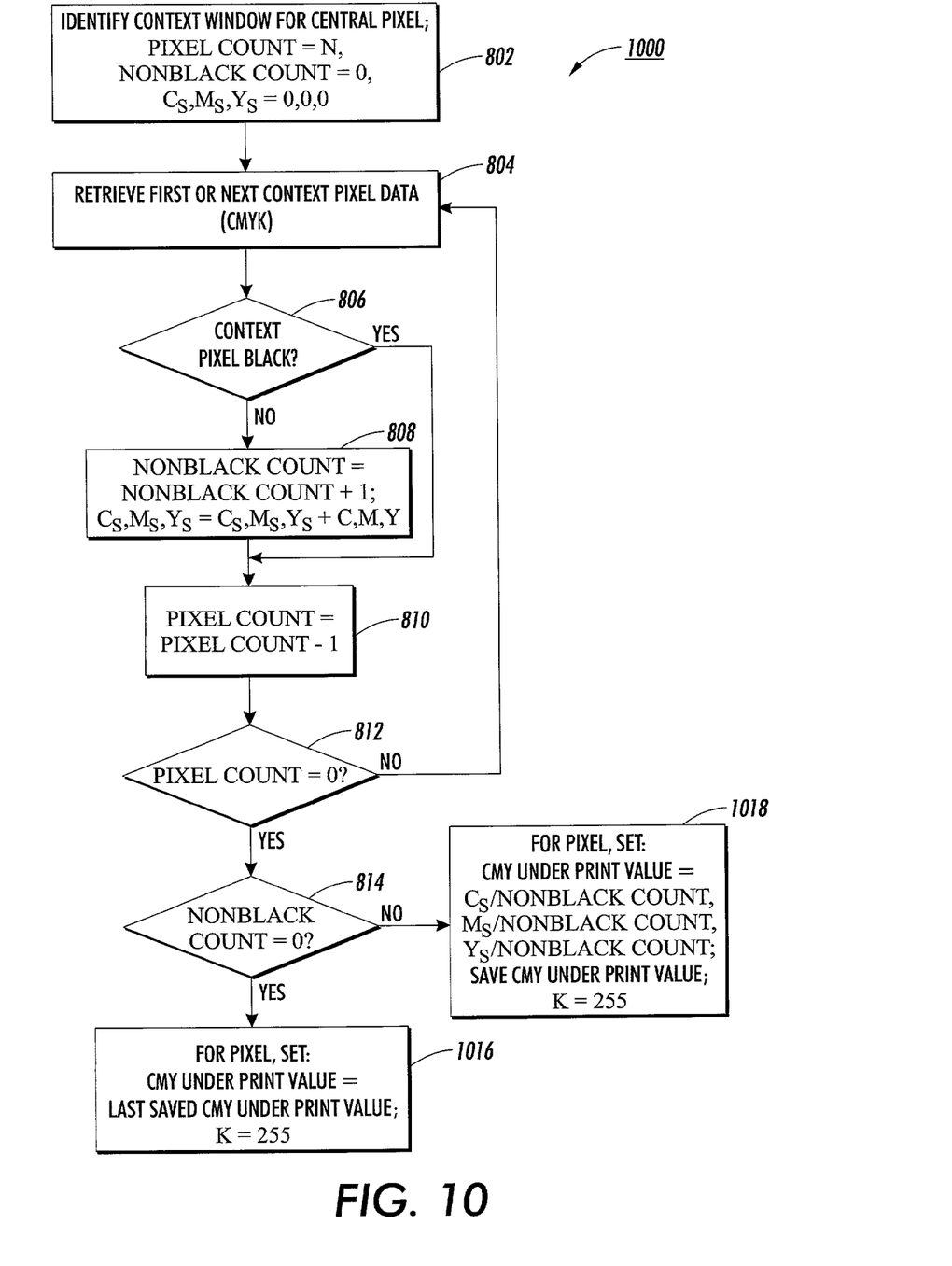

With reference to FIG. 10, a flowchart of still another embodiment of the black trapping and under print algorithm 710 from the flowchart of FIG. 7 is provided. This embodiment of the algorithm 1000 is similar to the black trapping and under print algorithm 800 of FIG. 8. The differences are shown after step 814, at steps 1016 and 1018, At step 814, if the NONBLACK COUNT does not equal zero, the C,M,Y under print value for the pixel retrieved from the frame buffer, resulting from dividing the $C_S$, $M_S$, $Y_S$ color summation values by the NONBLACK COUNTER (i e, $C_{AVG}$, $M_{AVG}$, $Y_{AVG}$ for the nonblack pixels in the context window), is saved 1018. Alternatively, at step 814, if the NONBLACK COUNT equals zero, the C,M,Y under print value for the pixel retrieved from the frame buffer is set to the last saved C,M,Y under print value and the K value for the pixel retrieved from the frame buffer is set to 255 (1016).

The invention has been described with reference to several embodiments. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method for performing black trapping on image data from a raster image processing frame buffer, wherein the image data includes pixel data according to a predetermined color space and black rendering hints, the method comprising the steps of:
   a) receiving the pixel data and the black rendering hints from the frame buffer,
   b) converting the pixel data from the frame buffer to device color space (e.g C,M,Y,K) data,
   c) retrieving the C,M,Y,K data and an associated black rendering hint for a first pixel;
   d) determining if the black rendering hint for the first pixel is true,
   e) if the black rendering hint is true, performing a black trapping algorithm using a plurality of pixels forming a context window associated with the first pixel and subsequently rendering the first pixel according to an under print system, otherwise, subsequently rendering the first pixel according to a default rendering system;
   f) determining if additional pixel data from the frame buffer is to be processed in accordance with steps c) through e); and,
   g) if additional pixel data is to be processed, repeating steps c) through e) for a next pixel, otherwise, ending the process.

2. The method as set forth in claim 1, wherein the predetermined color space for pixel data from the raster image processing frame buffer does not include a black channel.

3. The method as set forth in claim 1, wherein the predetermined color space for pixel data from the raster image processing frame buffer is an RGB color space.

4. The method as set forth in claim 1, if the black rendering hint is true, step e) further comprising:
   h) identifying a context window comprised of a predetermined number of pixels (N) surrounding the first pixel and setting a pixel counter equal to N,
   i) setting a nonblack counter equal to zero;
   j) setting $C_S$, $M_S$, and $Y_S$ color summation values equal to zero,
   k) retrieving the C,M,Y data and an associated black rendering hint for a first context pixel of the context window;
   l) determining if the black rendering hint for the first context pixel is true,
   m) if the black rendering hint is true, reducing the pixel counter by one, otherwise, i) incrementing the nonblack counter by one, ii) adding the C,M,Y values for the first context pixel to the current values of $C_S$, $M_S$, and $Y_S$ and iii) reducing the pixel counter by one;
   n) determining if the pixel counter is zero;
   o) if the pixel counter is zero, continuing on to the next step, otherwise, repeating steps k) through m) for a next context pixel of the context window,
   p) determining if the nonblack counter is zero, and,
   q) if the nonblack counter is zero, setting K for the first pixel equal to 255, otherwise, i) dividing the current values of $C_S$, $M_S$, and $Y_S$ by the current value of the nonblack counter, ii) setting C,M,Y for the first pixel equal to the result from i), and iii) setting K for the first pixel equal to 255.

5. The method as set forth in claim 1, if the black rendering hint is true, step e) further comprising:
   h) identifying a context window comprised of a predetermined number of pixels (N) surrounding the first pixel and setting a pixel counter equal to N,
   i) setting a nonblack counter equal to zero;
   j) setting $C_S$, $M_S$, and $Y_S$ color summation values equal to zero,
   k) retrieving the C,M,Y data and an associated black rendering hint for a first context pixel of the context window;
   l) determining if the black rendering hint for the first context pixel is true,
   m) if the black rendering hint is true, reducing the pixel counter by one, otherwise, i) incrementing the nonblack counter by one, ii) adding the C,M,Y values for the first context pixel to the current values of $C_S$, $M_S$, and $Y_S$ and iii) reducing the pixel counter by one,
   n) determining if the pixel counter is zero,
   o) if the pixel counter is zero, continuing on to the next step, otherwise, repeating steps k) through m) for a next context pixel of the context window,
   p) determining if the nonblack counter is zero; and,
   q) if the nonblack counter is zero, i) setting C,M,Y for the first pixel equal to a predetermined C,M,Y value and ii) setting K for the first pixel equal to 255, otherwise, i) dividing the current values of $C_S$, $M_S$, and $Y_S$ by the current value of the nonblack counter, ii) setting C,M,Y for the first pixel equal to the result from i), and iii) setting K for the first pixel equal to 255.

6. The method as set forth in claim 1, if the black rendering hint is true, step e) further comprising:
   h) identifying a context window comprised of a predetermined number of pixels (N) surrounding the first pixel and setting a pixel counter equal to N,
   i) setting a nonblack counter equal to zero,
   j) setting $C_S$, $M_S$, and $Y_S$ color summation values equal to zero,
   k) retrieving the C,M,Y data and an associated black rendering hint for a first context pixel of the context window;
   l) determining if the black rendering hint for the first context pixel is true,
   m) if the black rendering hint is true, reducing the pixel counter by one, otherwise, i) incrementing the nonblack counter by one, ii) adding the C,M,Y values for the first context pixel to the current values of $C_S$, $M_S$, and $Y_S$ and iii) reducing the pixel counter by one;
   n) determining if the pixel counter is zero;
   o) if the pixel counter is zero, continuing on to the next step, otherwise, repeating steps k) through m) for a next context pixel of the context window,
   p) determining if the nonblack counter is zero; and,
   q) if the nonblack counter is zero, i) setting C,M,Y for the first pixel equal to a previously saved C,M,Y value and ii) setting K for the first pixel equal to 255, otherwise, i) dividing the current values of $C_S$, $M_S$, and $Y_S$ by the current value of the nonblack counter, ii) setting C,M,Y for the first pixel equal to the result from i) and saving the C,M,Y value, and iii) setting K for the first pixel equal to 255.

7. A method for performing black trapping on image data from a raster image processing frame buffer, wherein the image data includes pixel data according to a predetermined color space, the method comprising the steps of:
   a) receiving the pixel data from the frame buffer,
   b) converting the pixel data from the frame buffer to C,M,Y,K pixel data, c) retrieving one or more components of pixel data from the group consisting of pixel data from the frame buffer and C,M,Y,K pixel data for a first pixel, d) determining if the first pixel is black with respect to predetermined thresholds for one or more components of the pixel data retrieved;

e) if the first pixel is black, performing a black trapping algorithm using a plurality of pixels forming a context window associated with the first pixel and subsequently rendering the first pixel according to an under print system, otherwise, subsequently rendering the first pixel according to a default rendering system, f) determining if additional pixel data from the frame buffer is to be processed in accordance with steps c) through e); and, g) if additional pixel data is to be processed, repeating steps c) through e) for a next pixel, otherwise, ending the process.

8. The method as set forth in claim 7, wherein the predetermined color space for pixel data from the raster image processing frame buffer does not include a black channel.

9. The method as set forth in claim 7, wherein the predetermined color space for pixel data from the raster image processing frame buffer is an RGB color space.

10. The method as set forth in claim 7, wherein the pixel data retrieved in step c) is in the format output from the raster image processing frame buffer, step d) further comprising determining if the first pixel is black with respect to predetermined thresholds for one or more components of the pixel data from the raster image processing frame buffer.

11. The method as set forth in claim 10, wherein the pixel data from the raster image processing frame buffer is represented in an RGB color space, step d) further comprising determining if the first pixel is black with respect to predetermined thresholds (T) for one or more expressions selected from the group consisting of i) R=G=B=0, ii) R+G+B<$T_1$, and iii) R<$T_2$, G<$T_3$, B<$T_4$.

12. The method as set forth in claim 7, step d) further comprising determining if the first pixel is black with respect to predetermined thresholds for one or more components of the pixel data in the C,M,Y,K color space.

13. The method as set forth in claim 12, step d) further comprising determining if the first pixel is black with respect to predetermined thresholds (T) for one or more expressions selected from the group consisting of i) K>$T_1$, ii) C+M+Y>$T_2$, and iii) C>$T_3$, M>$T_4$, Y>$T_5$.

14. The method as set forth in claim 7, if the first pixel is black, step e) further comprising:

h) identifying a context window comprised of a predetermined number of pixels (N) surrounding the first pixel and setting a pixel counter equal to N, i) setting a nonblack counter equal to zero, j) setting $C_S$, $M_S$, and $Y_S$ color summation values equal to zero, k) retrieving one or more components of pixel data from the group consisting of pixel data from the frame buffer and C,M,Y,K pixel data for a first context pixel of the context window;

l) determining if the first context pixel is black with respect to predetermined thresholds for one or more components of the pixel data retrieved;

m) if the first content pixel is black, reducing the pixel counter by one, otherwise, i) incrementing the nonblack counter by one, ii) adding the C,M,Y values for the first context pixel to the current values of $C_S$, $M_S$, and $Y_S$ and iii) reducing the pixel counter by one, n) determining if the pixel counter is zero, o) if the pixel counter is zero, continuing on to the next step, otherwise, repeating steps k) through m) for a next context pixel of the context window, p) determining if the nonblack counter is zero; and, q) if the nonblack counter is zero, setting K for the first pixel equal to 255, otherwise, i) dividing the current values of $C_S$, $M_S$, and $Y_S$ by the current value of the nonblack counter, ii) setting C,M,Y for the first pixel equal to the result from i), and iii) setting K for the first pixel equal to 255.

15. The method as set forth in claim 14, wherein the pixel data retrieved in step k) is in the format output from the raster image processing frame buffer, step l) further comprising determining if the first context pixel is black with respect to predetermined thresholds for one or more components of the pixel data from the raster image processing frame buffer.

16. The method as set forth in claim 15, wherein the pixel data from the raster image processing frame buffer is represented in an RGB color space, step l) further comprising determining if the first context pixel is black with respect to predetermined thresholds (T) for one or more expressions selected from the group consisting of i) R=G=B=0, ii) R+G+B<$T_1$, and iii) R<$T_2$, G<$T_3$, B<$T_4$.

17. The method as set forth in claim 14, step l) further comprising determining if the first context pixel is black with respect to predetermined thresholds for one or more components of the pixel data in the C,M,Y,K color space.

18. The method as set forth in claim 17, step d) further comprising determining if the first context pixel is black with respect to predetermined thresholds (T) for one or more expressions selected from the group consisting of i) K>$T_1$, ii) C+M+Y>$T_2$, and iii) C>$T_3$, M>$T_4$, Y>$T_5$.

19. The method as set forth in claim 7, if the first pixel is black, step e) further comprising:

h) identifying a context window comprised of a predetermined number of pixels (N) surrounding the first pixel and setting a pixel counter equal to N, i) setting a nonblack counter equal to zero, j) setting $C_S$, $M_S$, and $Y_S$ color summation values equal to zero, k) retrieving one or more components of pixel data from the group consisting of pixel data from the frame buffer and C,M,Y,K pixel data for a first context pixel of the context window, l) determining if the first context pixel is black with respect to predetermined thresholds for one or more components of the pixel data retrieved, m) if the first context pixel is black, reducing the pixel counter by one, otherwise, i) incrementing the nonblack counter by one, ii) adding the C,M,Y values for the first context pixel to the current values of $C_S$, $M_S$, and $Y_S$, and iii) reducing the pixel counter by one, n) determining if the pixel counter is zero, o) if the pixel counter is zero, continuing on to the next step, otherwise, repeating steps k) through m) for a next context pixel of the context window, p) determining if the nonblack counter is zero, and, q) if the nonblack counter is zero, i) setting C,M,Y for the first pixel equal to a predetermined C,M,Y value and ii) setting K for the first pixel equal to 255, otherwise, i) dividing the current values of $C_S$, $M_S$, and $Y_S$ by the current value of the nonblack counter, ii) setting C,M,Y for the first pixel equal to the result from i), and iii) setting K for the first pixel equal to 255.

20. The method as set forth in claim 19, wherein the pixel data retrieved in step k) is in the format output from the raster image processing frame buffer, step l) further comprising determining if the first context pixel is black with respect to predetermined thresholds for one or more components of the pixel data from the raster image processing frame buffer.

21. The method as set forth in claim 20, wherein the pixel data from the raster image processing frame buffer is represented in an RGB color space, step l) further comprising determining if the first context pixel is black with respect to predetermined thresholds (T) for one or more expressions selected from the group consisting of i) R=G=B=0, ii) R+G+B<$T_1$, and iii) R<$T_2$, G<$T_3$, B<$T_4$.

22. The method as set forth in claim 19, step l) further comprising determining if the first context pixel is black with respect to predetermined thresholds for one or more components of the pixel data in the C,M,Y,K color space.

23. The method as set forth in claim 22, step d) further comprising determining if the first context pixel is black with respect to predetermined thresholds (T) for one or more expressions selected from the group consisting of i) K>$T_1$, ii) C+M+Y>$T_2$, and iii) C>$T_3$, M>$T_4$, Y>$T_5$.

24. The method as set forth in claim 7, if the first pixel is black, step e) further comprising:
  h) identifying a context window comprised of a predetermined number of pixels (N) surrounding the first pixel and setting a pixel counter equal to N,
  i) setting a nonblack counter equal to zero,
  j) setting $C_S$, $M_S$, and $Y_S$ color summation values equal to zero,
  k) retrieving one or more components of pixel data from the group consisting of pixel data from the frame buffer and C,M,Y,K pixel data for a first context pixel of the context window,
  l) determining if the first context pixel is black with respect to predetermined thresholds for one or more components of the pixel data retrieved,
  m) if the black rendering hint is true, reducing the pixel counter by one, otherwise, i) incrementing the nonblack counter by one, ii) adding the C,M,Y values for the first context pixel to the current values of $C_S$, $M_S$, and $Y_S$ and iii) reducing the pixel counter by one,
  n) determining if the pixel counter is zero,
  o) if the pixel counter is zero, continuing on to the next step, otherwise, repeating steps k) through m) for a next context pixel of the context window,
  p) determining if the nonblack counter is zero; and,
  q) if the nonblack counter is zero, i) setting C,M,Y for the first pixel equal to a previously saved C,M,Y value and ii) setting K for the first pixel equal to 255, otherwise, i) dividing the current values of $C_S$, $M_S$, and $Y_S$ by the current value of the nonblack counter, ii) setting C,M,Y for the first pixel equal to the result from i) and saving the C,M,Y value, and iii) setting K for the first pixel equal to 255.

25. The method as set forth in claim 24, wherein the pixel data retrieved in step k) is in the format output from the raster image processing frame buffer, step l) further comprising determining if the first context pixel is black with respect to predetermined thresholds for one or more components of the pixel data from the raster image processing frame buffer.

26. The method as set forth in claim 25, wherein the pixel data from the raster image processing frame buffer is represented in an RGB color space, step l) further comprising determining if the first context pixel is black with respect to predetermined thresholds (T) for one or more expressions selected from the group consisting of i) R=G=B=0, ii) R+G+B<$T_1$, and iii) R<$T_2$, G<$T_3$, B<$T_4$.

27. The method as set forth in claim 24, step l) further comprising determining if the first context pixel is black with respect to predetermined thresholds for one or more components of the pixel data in the C,M,Y,K color space.

28. The method as set forth in claim 27, step d) further comprising determining if the first context pixel is black with respect to predetermined thresholds (T) for one or more expressions selected from the group consisting of i) K>$T_1$, ii) C+M+Y>$T_2$, and iii) C>$T_3$, M>$T_4$, Y>$T_5$.

* * * * *